US008876916B2

United States Patent
Miyachi et al.

(10) Patent No.: US 8,876,916 B2
(45) Date of Patent: Nov. 4, 2014

(54) SOLID ELECTROLYTIC CAPACITOR

(71) Applicant: SANYO Electric Co., Ltd., Moriguchi (JP)

(72) Inventors: Yuji Miyachi, Daito (JP); Kohei Goto, Daito (JP); Kazuhiro Kato, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/728,682

(22) Filed: Dec. 27, 2012

(65) Prior Publication Data

US 2013/0115368 A1   May 9, 2013

Related U.S. Application Data

(63) Continuation of application No. 12/665,963, filed as application No. PCT/JP2008/057989 on Apr. 24, 2008, now abandoned.

(30) Foreign Application Priority Data

Jul. 2, 2007  (JP) ................................ 2007-173619
Jul. 2, 2007  (JP) ................................ 2007-173624

(51) Int. Cl.
H01G 9/00       (2006.01)
H01G 9/028      (2006.01)
H01G 11/48      (2013.01)
H01G 9/15       (2006.01)

(52) U.S. Cl.
CPC ............ *H01G 9/0036* (2013.01); *H01G 9/028* (2013.01); *H01G 11/48* (2013.01); *Y02E 60/13* (2013.01); *H01G 9/15* (2013.01)
USPC ........................................................ 29/25.03

(58) Field of Classification Search
USPC ........................................... 29/25.03; 427/80
See application file for complete search history.

(56) References Cited

U.S. PATENT DOCUMENTS

| 6,206,937 | B1 | 3/2001 | Kudoh et al. |
| 6,982,865 | B2 | 1/2006 | Kawata et al. |
| 2005/0078435 | A1 | 4/2005 | Kawata et al. |
| 2005/0088804 | A1 | 4/2005 | Matsuzaki et al. |

FOREIGN PATENT DOCUMENTS

| CN | 1612274 A | 5/2005 |
| EP | 1873182 A1 | 1/2008 |
| JP | 3076873 B2 | 8/2000 |
| JP | 2005-116777 A | 4/2005 |

(Continued)

OTHER PUBLICATIONS

Machine translation of JP 2005-203662, Mar. 23, 2014.*

(Continued)

*Primary Examiner* — Richard Booth
(74) *Attorney, Agent, or Firm* — Westerman, Hattori, Daniels & Adrian, LLP

(57) ABSTRACT

A method of manufacturing a solid electrolytic capacitor excellent in reliability, particularly in ESR property, wherein in a solid electrolytic capacitor having a solid electrolyte layer, the solid electrolyte layer has a conductive polymer layer formed by a chemical polymerization method or an electrolytic polymerization method, using a polymerization liquid containing at least a monomer and a dopant-introducing agent. The dopant-introducing agent contains a dopant-introducing agent containing at least alkylammonium ions as a cationic component. The dopant-introducing agent in the polymerization liquid may further contain a dopant-introducing agent containing at least metal ions as a cationic component.

6 Claims, 1 Drawing Sheet

(56) References Cited

FOREIGN PATENT DOCUMENTS

| JP | 2005-135990 A | 5/2005 |
|---|---|---|
| JP | 2005-203662 A | 7/2005 |
| WO | 2006/085601 A1 | 8/2006 |

OTHER PUBLICATIONS

International Search Report of PCT/JP2008/057989, mailing date of Aug. 5, 2008.

Chinese Office Action dated Jan. 12, 2011, issued in corresponding Chinese Patent Application No. 2008-80022970.4.
Chinese Office Action dated Jul. 12, 2011, issued in corresponding Chinese Patent Application No. 200880022970.4.
Japanese Office Action dated Oct. 1, 2013, issued in Japanese Patent Application No. 2013-058351, w/English translation, (5 pages).
Japanese Office Action dated May 7, 2014, issued in Japanese Patent Application No. 2013-058352 with English translation (7 pages).

* cited by examiner

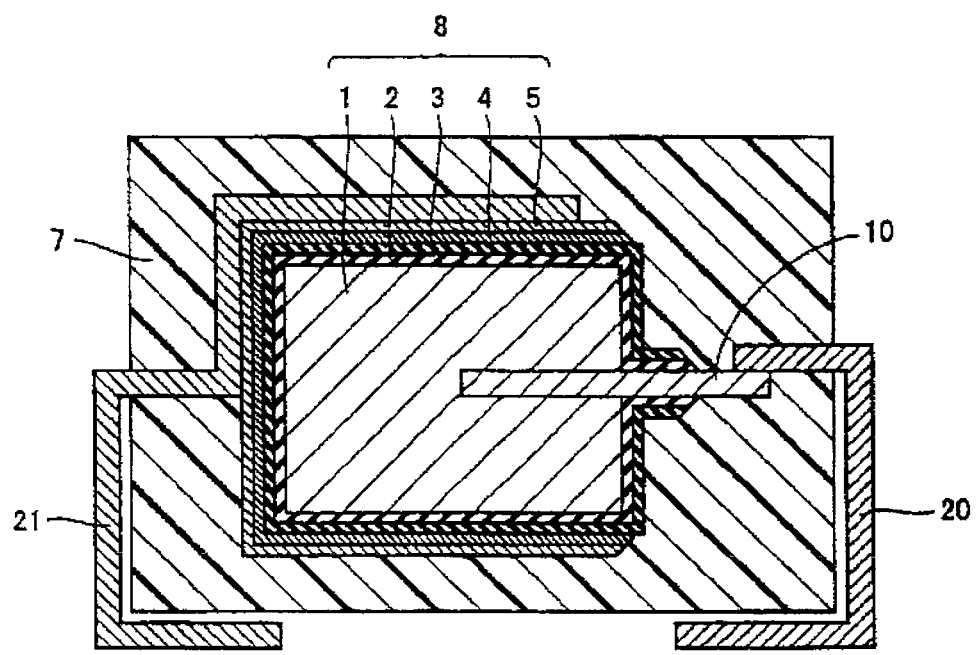

SOLID ELECTROLYTIC CAPACITOR

CROSS-REFERENCE TO RELATED APPLICATIONS

This application is a continuation of U.S. application Ser. No. 12/665,963 filed on Dec. 22, 2009, which is a 371 of International Application No. PCT/JP2008/057989 filed on Apr. 24, 2008, which is based upon and claims the benefit of priority from Japanese Patent Application No. 2007-173619 filed on Jul. 2, 2007 and priority from Japanese Patent Application No. 2007-173624 filed on Jul. 2, 2007, the entire contents of which being incorporated herein by reference.

TECHNICAL FIELD

The present invention relates to a solid electrolytic capacitor using a conductive polymer as a solid electrolyte layer.

BACKGROUND ART

Recently, as electronic equipment is reduced in size and weight, high-frequency capacitors with a lower impedance in a high frequency region, a smaller size, and a larger capacity have been required.

Although mica capacitors, film capacitors, ceramic capacitors, and the like are used as high-frequency capacitors, these capacitors are not suitable for large capacity applications.

On the other hand, examples of capacitors suitable for large capacity applications include aluminum electrolytic capacitors, tantalum electrolytic capacitors, and the like. However, although the aluminum electrolytic capacitor can achieve a large capacity with low cost, it has problems such as temporal change due to evaporation of an electrolytic solution as it uses the electrolytic solution, high impedance in a high frequency region, and the like.

The tantalum solid electrolytic capacitor is a capacitor with less capacity degradation, as it uses solid manganese dioxide as an electrolyte. However, since a coating film of manganese dioxide has poor self-repairing ability, there are disadvantages such as the risk of catching fire when a dielectric coating film is damaged while electric power is being supplied.

Consequently, to solve the problems described above, it has been proposed recently to use a conductive polymer that is excellent in electric conductivity and easily forms a solid electrolyte, as a solid electrolyte. With this technique, it has become possible to obtain a solid electrolytic capacitor that can be manufactured with less cost, ensures capacitance, and has no damage in a dielectric coating film and less leakage current, when compared with the solid electrolytic capacitor described above.

Herein, the conductive polymer refers to a polymer obtained by polymerizing pyrrole, thiophene, furan, aniline, and the like.

Such a solid electrolytic capacitor has also been required to have a reduced ESR (Equivalent Series Resistance), a reduced LC (Leakage Current), and the like to improve reliability.

To solve the problems as described above, methods of forming a conductive polymer as a solid electrolyte layer, using an electrolytic polymerization liquid prepared by mixing a plurality of dopant-introducing agents having different properties, have been proposed (for example, Patent Document 1).

Patent Document 1: Japanese Patent Laying-Open No. 2005-116777

DISCLOSURE OF THE INVENTION

Problems to be Solved by the Invention

However, reliability cannot be improved sufficiently even with the methods described above, and in particular it has been required to further reduce the ESR.

Means for Solving the Problems

To solve the problems described above, a first aspect of the present invention is characterized in that, in a solid electrolytic capacitor having a solid electrolyte layer, the solid electrolyte layer has a conductive polymer layer formed by a chemical polymerization method and/or an electrolytic polymerization method, using a polymerization liquid containing at least a monomer and a dopant-introducing agent, and that the polymerization liquid contains the dopant-introducing agent containing at least alkylammonium ions as a cationic component. The alkylammonium ions are preferably primary ammonium ions, and an alkyl group preferably has a carbon number of 1 to 4. Further, it is preferable that an anionic component of the dopant-introducing agent containing at least the alkylammonium ions as the cationic component is aromatic sulfonic acid ions, in particular tetralin sulfonic acid ions.

Further, another aspect of the present invention is characterized in that, in the polymerization liquid, the dopant-introducing agent further contains a dopant-introducing agent containing metal ions as a cationic component. An anionic component of the dopant-introducing agent is preferably naphthalene sulfonic acid ions or anions of a derivative thereof.

Effects of the Invention

With a configuration of the present invention, a solid electrolytic capacitor excellent in reliability, particularly in ESR property, can be provided.

BRIEF DESCRIPTION OF THE DRAWINGS

FIG. 1 is a front sectional view of a solid electrolytic capacitor of the present invention.

DESCRIPTION OF THE REFERENCE SIGNS 1 anode body
2 dielectric coating film layer
3 solid electrolyte layer
4 conductive carbon layer
5 silver paste layer
7 outer packaging resin
8 capacitor element
10 anode lead
20 anode lead frame
21 cathode lead frame

BEST MODES FOR CARRYING OUT THE INVENTION

Best modes for carrying out the present invention will be described below.

Embodiment 1

FIG. 1 is a front sectional view of a solid electrolytic capacitor of the present invention. A capacitor element 8 is formed by sequentially forming a dielectric coating film layer 2, a solid electrolyte layer 3, a conductive carbon layer 4, and a silver paste layer 5 on a peripheral surface of an anode body 1 provided with an anode lead 10.

Specifically, capacitor element 8 is formed by forming dielectric coating film layer 2 using an acid such as phosphoric acid, adipic acid, or the like, on the peripheral surface of anode body 1 made of a valve metal provided with anode lead 10 made of a valve metal, and forming solid electrolyte layer 3 on a peripheral surface of dielectric coating film layer 2. Preferably, anode lead 10 and anode body 1 are made of the same valve metal.

Herein, solid electrolyte layer 3 includes a conductive polymer layer formed using a dopant-introducing agent containing alkylammonium ions as a cationic component. The conductive polymer layer is formed, for example, by using a heterocyclic compound such as thiophene or pyrrole and/or a derivative thereof, or aniline and/or a derivative thereof, as a monomer, and forming the conductive polymer layer by a chemical polymerization method using a polymerization liquid containing the monomer, an oxidant, and a dopant-introducing agent, or by an electrolytic polymerization method using a polymerization liquid containing the monomer and a dopant-introducing agent. Preferably, pyrrole or a derivative thereof is used as the monomer. Various additives may be added to the polymerization liquid.

The alkylammonium ions as the cationic component of the dopant-introducing agent refer to alkylammonium ions in which at least one of hydrogen groups of an ammonium ion is substituted with an alkyl group. Preferably, the alkyl group has a carbon number of 1 to 4. If the alkyl group has a carbon number of 5 or more, the effect of reducing the ESR may not be obtained. The alkyl group used herein also includes an alkyl group in which a portion or all of hydrogen groups of the alkyl group are substituted with other functional groups, and may be, for example, an alkoxy alkyl group, a hydroxy alkyl group, or the like.

An anionic component of the dopant-introducing agent is not particularly limited, and can be arbitrarily selected from well-known ones. As the anionic component, aromatic sulfonic acid ions, in particular tetralin sulfonic acid ions, are preferable. The aromatic sulfonic acid ions and the tetralin sulfonic acid ions also include those in which a portion of hydrogen groups attached to an aromatic ring or a tetralin ring is substituted with a functional group such as an alkyl group.

On a peripheral surface of solid electrolyte layer 3 formed as described above, conductive carbon layer 4 and silver paste layer 5 are sequentially formed using a well-known method, and thus capacitor element 8 is produced.

Anode lead 10 of capacitor element 8 is connected with an anode lead frame 20, and silver paste layer 5 is connected with a cathode lead frame 21. Molding is performed to coat capacitor element 8 with an outer packaging resin 7, except for portions of anode lead frame 20 and cathode lead frame 21. The portions of anode lead frame 20 and cathode lead frame 21 exposed from outer packaging resin 7 are bent to follow outer packaging resin 7, and thus the solid electrolytic capacitor of the present invention is produced.

Embodiment 2

A solid electrolytic capacitor of Embodiment 2 of the present invention will be described below. The solid electrolytic capacitor of Embodiment 2 of the present invention also has the structure shown in FIG. 1, as in the solid electrolytic capacitor of Embodiment 1. Solid electrolyte layer 3 of Embodiment 2 also includes a conductive polymer layer, as in Embodiment 1. A method of forming the conductive polymer layer is identical to the method in Embodiment 1.

A dopant-introducing agent used in forming the conductive polymer layer of Embodiment 2 is made of a plurality of materials, and contains at least a dopant-introducing agent containing alkylammonium ions as a cationic component and a dopant-introducing agent containing metal ions as a cationic component. Herein, the alkylammonium ions refer to those in which at least one of hydrogen groups of an ammonium ion is substituted with an alkyl group. The alkyl group also includes an alkyl group in which a portion or all of hydrogen groups thereof are substituted with other functional groups.

An anionic component of the dopant-introducing agent containing the alkylammonium ions as the cationic component is preferably aromatic sulfonic acid ions, in particular, tetralin sulfonic acid ions. The tetralin sulfonic acid ions according to the present invention also include those in which a portion of hydrogen groups attached to a tetralin ring is substituted with another functional group. When tetralin sulfonic acid alkylamine is used as a dopant-introducing agent, a solid electrolytic capacitor formed using it exhibits excellent ESR property.

Further, an anionic component of the dopant-introducing agent containing the metal ions as the cationic component is preferably naphthalene sulfonic acid ions. When naphthalene sulfonic acid metal salt is taken into the conductive polymer layer as a dopant-introducing agent, the conductive polymer layer exhibits excellent heat resistance. Therefore, a solid electrolytic capacitor having less change in ESR before and after reflow and excellent heat resistance can be provided. Herein, the naphthalene sulfonic acid ions of the present invention also include those in which a portion of hydrogen groups attached to a naphthalene ring is substituted with another functional group.

A mole ratio of the dopant-introducing agent containing the metal ions as the cationic component to the dopant-introducing agent containing the alkylammonium ions as the cationic component is preferably ⅓ or less. If the dopant containing the metal ions as the cationic component is increased more than this ratio, the effect of reducing the ESR in the solid electrolytic capacitor is deteriorated. More preferably, the mole ratio of the dopant-introducing agent containing the metal ions as the cationic component to the dopant-introducing agent containing the alkylammonium ions as the cationic component is 1 to 4. A solid electrolytic capacitor produced using this ratio is excellent in ESR property.

On a peripheral surface of solid electrolyte layer 3 produced using the materials described above, conductive carbon layer 4 and silver paste layer 5 are formed by a conventionally well-known method, and thus capacitor element 8 is produced.

Anode lead 10 of capacitor element 8 produced as described above is connected with anode lead frame 20, and silver paste layer 5 is connected with cathode lead frame 21. Then, capacitor element 8 is coated with outer packaging resin 7, with portions of anode and cathode lead frames 20 and 21 being exposed. Anode and cathode lead frames 20 and 21 exposed from outer packaging resin 7 are bent to follow outer packaging resin 7, and thus the solid electrolytic capacitor is completed.

EXAMPLES

Embodiment 1 of the present invention was studied as described below.

Example 1

On a peripheral surface of an anode body made of a valve metal provided with an anode lead, a dielectric coating film layer was formed by a conventionally well-known method. Subsequently, a solid electrolyte layer was formed. Specifically, a conductive pre-coat layer was formed on a surface of the dielectric coating film layer by a conventionally well-known method, and then electrolytic polymerization was performed using the conductive pre-coat layer as an anode, using a polymerization liquid containing pyrrole (0.2 mol/l) as a monomer and tetralin sulfonic acid methylamine (0.1 mol/l) as a dopant-introducing agent, to form a conductive polymer layer.

Thereafter, a conductive carbon layer and a silver paste layer were formed on a peripheral surface of the solid electrolyte layer by a conventionally well-known method, and thus a capacitor element was produced.

After producing the capacitor element, the anode lead was connected with an anode lead frame by resistance welding or the like, and the silver paste layer was connected with a cathode lead frame, with a conductive paste or the like being interposed therebetween. The capacitor element was coated with an outer packaging resin such that portions of the anode lead frame and the cathode lead frame were exposed. The exposed anode and cathode lead frames were bent to follow the outer packaging resin, and thereby a solid electrolytic capacitor was completed.

Example 2

A solid electrolytic capacitor was produced as in Example 1 except for using tetralin sulfonic acid ethylamine (0.1 mol/l) as a dopant-introducing agent.

Example 3

A solid electrolytic capacitor was produced as in Example 1 except for using tetralin sulfonic acid ethoxypropylamine (0.1 mol/l) as a dopant-introducing agent.

Example 4

A solid electrolytic capacitor was produced as in Example 1 except for using tetralin sulfonic acid butylamine (0.1 mol/l) as a dopant-introducing agent.

Example 5

A solid electrolytic capacitor was produced as in Example 1 except for using tetralin sulfonic acid diisopropylamine (0.1 mol/l) as a dopant-introducing agent.

Example 6

A solid electrolytic capacitor was produced as in Example 1 except for using tetralin sulfonic acid dipropylamine (0.1 mol/l) as a dopant-introducing agent.

Example 7

A solid electrolytic capacitor was produced as in Example 1 except for using tetralin sulfonic acid triethylamine (0.1 mol/l) as a dopant-introducing agent.

Comparative Example 1

A solid electrolytic capacitor was produced as in Example 1 except for using tetralin sulfonic acid sodium (0.1 mol/l) as a dopant-introducing agent.

ESRs of the solid electrolytic capacitors of Examples 1 to 7 and Comparative Example 1 described above were measured. Table 1 shows the results.

TABLE 1

|   | ESR [m$\Omega$] |
|---|---|
| Example 1 | 9.6 |
| Example 2 | 9.7 |
| Example 3 | 10.7 |
| Example 4 | 11.2 |
| Example 5 | 9.6 |
| Example 6 | 10.4 |
| Example 7 | 10.7 |
| Comparative Example 1 | 11.7 |

As can be seen from Table 1, in the solid electrolytic capacitors in which a cationic component of the dopant-introducing agent is alkylammonium ions (Examples 1 to 7), the ESRs are suppressed low, when compared with that of the solid electrolytic capacitor in which a cationic component of the dopant-introducing agent is metal ions (Comparative Example 1). It can also be seen that a lower amino group with a shorter chain length has a greater effect of reducing the ESR. Further, it is found as a result of comparing Examples 1 to 4 that, among primary amines, a primary amine having an alkyl group with a smaller carbon number (i.e., shorter chain length) has a greater effect of reducing the ESR. Although the reason for this is not known, conceivably it is because, when an alkyl group has a longer chain length, a molecule becomes bulky, stable and highly dispersed micelles cannot be formed, and effective doping cannot be performed, and thereby the effect of reducing the ESR is less likely to be obtained.

Next, Embodiment 2 of the present invention was studied as described below.

Example 8

On a peripheral surface of an anode body provided with an anode lead, a dielectric oxide coating film layer was formed by a conventionally well-known method. Subsequently, a conductive pre-coat layer was formed by a chemical polymerization method, and then a capacitor element having the formed conductive pre-coat layer was immersed in an electrolytic polymerization liquid containing at least pyrrole (0.2 mol/l) as a monomer, tetralin sulfonic acid methylamine as a dopant-introducing agent containing alkylammonium ions as a cationic component, and alkylnaphthalene sulfonic acid sodium as a dopant-introducing agent containing metal ions as a cationic component, with concentrations of the dopant-introducing agents being adjusted such that a mole ratio of tetralin sulfonic acid methylamine to alkylnaphthalene sulfonic acid sodium was set to 4 to 1, and a total of 0.1 mol/l of the dopant-introducing agents was contained. Subsequently, electrolytic polymerization was performed using the conductive pre-coat layer as an anode, to form a conductive polymer layer. Thereafter, a solid electrolytic capacitor was produced as in Example 1.

Example 9

A solid electrolytic capacitor was produced as in Example 8 except for using tetralin sulfonic acid ethylamine instead of tetralin sulfonic acid methylamine.

Example 10

A solid electrolytic capacitor was produced as in Example 8 except for using tetralin sulfonic acid ethoxypropylamine instead of tetralin sulfonic acid methylamine.

Example 11

A solid electrolytic capacitor was produced as in Example 10 except for adjusting such that a mole ratio of tetralin sulfonic acid ethoxypropylamine to alkylnaphthalene sulfonic acid sodium was set to 2 to 1, and a total of 0.1 mol/l of the dopant-introducing agents was contained.

Comparative Example 2

A solid electrolytic capacitor was produced as in Example 8 except for using tetralin sulfonic acid sodium instead of tetralin sulfonic acid methylamine.

Comparative Example 3

A solid electrolytic capacitor was produced as in Example 11 except for using tetralin sulfonic acid sodium instead of tetralin sulfonic acid ethoxypropylamine.

ESRs of the solid electrolytic capacitors of Examples 8 to 11 and Comparative Examples 2 and 3 described above were measured. Table 2 shows the results.

TABLE 2

|  | ESR [mΩ] |
| --- | --- |
| Example 8 | 11.4 |
| Example 9 | 11.3 |
| Example 10 | 11.1 |
| Example 11 | 10.6 |
| Example 12 | 11.0 |
| Comparative Example 2 | 11.8 |
| Comparative Example 3 | 11.7 |

As can be seen from Table 2, in the solid electrolytic capacitors in Examples 8 to 11 in which alkylammonium ions are contained as a cationic component of the dopant-introducing agent, the ESRs are suppressed low, when compared with those of Comparative Examples 2 and 3 in which only a dopant-introducing agent containing metal ions as a cationic component is used.

Further, it is found as a result of comparing Examples 10 and 11 that the ESR can be suppressed lower when a ratio of mixing the dopant-introducing agents is adjusted such that a mole ratio of the dopant-introducing agent containing the alkylammonium ions as the cationic component to the dopant-introducing agent containing the metal ions as the cationic component is set to 4 to 1, which is a desired ratio of mixing the dopant-introducing agents.

The examples described above are merely provided to describe the present invention, and should not be interpreted as restricting the invention described in the scope of claims. The present invention can be freely modified within the scope of claims and within the scope having equivalent meaning.

The invention claimed is:

1. A method of manufacturing a solid electrolytic capacitor having a solid electrolyte layer, comprising the steps of:
    forming a conductive polymer layer by a chemical polymerization method and/or an electrolytic polymerization method, using a polymerization liquid containing at least a monomer and a first dopant-introducing agent; and
    forming said solid electrolyte layer including the step of forming said conductive polymer layer, wherein
    said polymerization liquid contains said first dopant-introducing agent containing at least alkylammonium ions as a cationic component and at least first aromatic sulfonic acid ions as an anionic component, and
    said first aromatic sulfonic acid ions are tetralin sulfonic acid ions.

2. The method of manufacturing a solid electrolytic capacitor according to claim 1, wherein said alkylammonium ions are primary ammonium ions.

3. The method of manufacturing a solid electrolytic capacitor according to claim 1, wherein an alkyl group of said alkyl ammonium ion has a carbon number of 1 to 4.

4. The method of manufacturing a solid electrolytic capacitor according to claim 1, wherein said monomer is pyrrole or a derivative thereof.

5. The method of manufacturing a solid electrolytic capacitor according to claim 1, wherein said polymerization liquid contains a second dopant-introducing agent containing at least metal ions as a cationic component and at least second aromatic sulfonic acid ions as an anionic component.

6. The method of manufacturing a solid electrolytic capacitor according to claim 5, said second aromatic sulfonic acid ions are naphthalene sulfonic acid ions or anions of a derivative thereof.

* * * * *